United States Patent [19]
Sampey

[11] 3,796,864
[45] Mar. 12, 1974

[54] VEHICLE SEPARATION MEASURING SYSTEM
[75] Inventor: Harry R. Sampey, Vanderbilt, Pa.
[73] Assignee: Pentron Industries, Inc., Cleveland, Ohio
[22] Filed: Apr. 19, 1972
[21] Appl. No.: 245,432

[52] U.S. Cl. .......... 235/92 EV, 246/167 D, 340/33, 235/103.5 R, 235/92 DN, 235/92 TC, 235/92 R, 235/92 EA
[51] Int. Cl. ............................................. G06m 3/14
[58] Field of Search ...... 235/92 EV, 92 DN, 92 TC, 235/92 PE, 92 CA, 92 EA, 103.5 R, 95 R; 340/33, 31, 32, 47; 246/167 D, 122, 30, 187 C

[56] References Cited
UNITED STATES PATENTS

| | | | |
|---|---|---|---|
| 2,974,304 | 3/1961 | Nordlund | 340/33 |
| 3,683,328 | 8/1972 | Fayling | 340/33 |
| 2,898,040 | 8/1959 | Steele | 235/103.5 R |
| 2,959,772 | 11/1960 | Bruner | 235/103.5 R |
| 3,199,104 | 8/1965 | Miller | 235/92 DN |
| 3,426,181 | 2/1969 | De Priest | 235/92 TC |
| 3,461,423 | 8/1969 | Trumble | 340/33 |

Primary Examiner—Paul J. Henon
Assistant Examiner—Joseph M. Thesz, Jr.
Attorney, Agent, or Firm—Cushman, Darby & Cushman

[57] ABSTRACT

Apparatus and method for monitoring the separation distance between a lead vehicle and a following or tracking vehicle. Besides merely monitoring such separation distance, provisions are made which greatly facilitate the maintenance of a predetermined value of distance separation. Furthermore, the predetermined value of distance separation may be adjustably preset to any desired value. First and second pulse trains are generated representing distance increments travelled by the lead and tracking vehicles respectively. The first and second pulse trains are coupled to the up and to the down counting inputs respectively of an up-down counter such that the instantaneous contents of the up-down counter represents the distance separation between the lead and tracking vehicle. The contents of the up-down counter is compared with a preset number representing a desired separation between the two vehicles and an audio oscillator or other indicator is controlled as a result of this comparison process. In the exemplary embodiment, a steady tone is emitted when the desired separation exists while burst tones of different frequencies are produced when the separation distance is either above or below the preset desired value. The repetition rate of the tone bursts is approximately proportional to the speed of vehicle separation or closure as the case may be. In the preferred embodiment, distance pulses from a moving lead vehicle are transmitted via a radio communications circuit to the up-down counter and comparison apparatus which is located in the tracking vehicle to facilitate the marking of highways for passing and no-passing zones, etc.

22 Claims, 6 Drawing Figures

Fig. 4

VEHICLE SEPARATION MEASURING SYSTEM

This application is related to my prior copending U.S. application Ser. No. 194,401 filed Nov. 1, 1971 and the disclosure in said prior application is hereby incorporated by reference.

This invention generally relates to apparatus and method for accurately measuring the distance of separation between two vehicles traversing a common roadway or path.

More specifically, this invention is directed towards apparatus and method for monitoring the distance separation between a load vehicle and a subsequent tracking vehicle while they are traversing a common roadway. Furthermore, the exemplary embodiment of this invention also includes a comparison of the actual value of distance separation with a predetermined desired value of distance separation and provides an indication when the desired value of distance separation have been achieved. The predetermined desired value of distance separation may also be preset or programmed as desired in the exemplary embodiment to be discussed below.

Although the exemplary embodiment will be described primarily with regard to a single proposed application, there are many possible applications for this invention as will be appreciated by those in the art. In general, this invention will be of considerable value and use wherever it is desired to maintain a given separation between two vehicles and/or wherever it is desired to monitor the distance of separation between two vehicles.

One such situation where this invention will find considerable use is in marking "no-passing" zones onto the surfaces of existing highways. For vehicle operation at a given speed limit along a given highway, a no-passing zone should start a given distance below a creat of a hill where it is no longer safe for the car travelling up the hil to pass because of the possibility of unseen approaching vehicles from the opposite side of the hill crest. The "no-passing" zone should continue until a safe field of forward vision is again available.

A technique which is often attempted for determining the beginning and ending points of such "no-passing" zones involves two vehicles traversing the same roadway while attempting to maintain a given separation distance between the two vehicles. When the tracking vehicle loses sight of the lead vehicle, a beginning mark is applied to the surface of the highway indicating the start of a "no-passing" zone. When the tracking vehicle again establishes visual contact with the lead vehicle, the end of the no-passing zone is marked on the surface of the highway. As will be appreciated by those in the art, there is considerable difficulty in establishing and maintaining the desired given separation between these two vehicles. This problem is especially accentuated right at the critical time period when the two vehicles actually becomes visually isolated by a hill crest or curves in the roadway, etc.

As an example of such a problem, it may be assumed that for a given highway speed it is desired to maintain a separated distance between a lead and tracking vehicle of a thousand feet while traversing the same roadway and to maintain this separated distance within an indicated accuracy of better than one percent. If the desired separated distance can be accurately maintained, then as the two vehicles traverse a grade (while still maintaining a desired separation), the tracking vehicle marks the highway as the lead vehicle disappears from sight over the crest of the hill. This marking of the highway by the tracking vehicle is the beginning of the no-passing zone.

As those in the art will appreciate, this specific example is but one of many possible problems in marking various zoning marks on the surface of a highway, many of which zoning problems involve maintaining given distance separations between two vehicles as a part of the marking process. Other uses will readily present themselves as this invention becomes known. For instance, in maintaining separation between police cars, etc.

Prior attempts to solve this problem have proved either inadequate or entirely too costly for practical success. As a consequence of the inability to maintain a given separation between two vehicles, "no-passing" zones are often improperly marked on the surface of highways and such improper markings often lead to disastrous consequences as should be readily appreciated.

A simple expedient of tying the two vehicles together with a long rope or the like of the proper length (distance of separation) is woefully inadequate as will be appreciated when visualizing the process of traversing a roadway having many curves and hills, etc. wherein the straight line rope distance of separation between the two vehicles does not correspond to the actual separation of the two vehicles along the roadway surface. Furthermore, this is a very clumsy technique at best. Since the no-passing zones are marked when the two vehicles do not have a straight line of sight visual contact therebetween, obviously the rope technique is going to have difficulties.

Others have attempted to solve this problem by devising elaborate and costly radar ranging techniques between the two vehicles. Besides the fact that these techniques have been less than completely successful in attempted practice, such systems are so costly as to put them outside the realm of a practical solution.

This invention represents the first known practical solution to the problem which is both simple and relatively inexpensive while yet being extremely accurate.

In the exemplary embodiment of this invention (which is described in more detail below) distance pulses are generated by both the lead vehicle and the tracking vehicle. Each distance pulse represents a predetermined increment of distance travelled by that respective vehicle from a common starting point. In effect, the distance travelled by the tracking vehicle is subtracted from the distance travelled by the lead vehicle thus obtaining a difference value which is directly represetative of the actual distance of separation along the roadway between the lead and tracking vehicles. In the exemplary embodiment, this is achieved by applying the distance pulses representing increments of distance travelled by the lead vehicle to the up-counting input of an up-down counter while the distance pulses representing increments of distance travelled by the tracking vehicle are input to the down-counting input of the same up-down counter.

As will be appreciated, at any given instant, the contents of the up-down counter thus indicates the then existing distance of separation between the lead and tracking vehicle. The contents of the up-down counter are used to drive conventional visible display devices to give a numeric display of the instantaneous monitored separation distance between the two vehicles. Furthermore, the contents of the up-down counter are also input to one side of a digital comparing circuit. The other inputs to the digital comparing circuit are selected by programming switches to represent a desired predetermined distance of separation. When the comparing circuit finds the actual distance of separation to be equal to the desired programmed distance of separation, an indication of this is given.

In the exemplary embodiment, provisions are also made in the comparing unit for disregarding the lower order stages of comparison thus permitting an indication of acceptable distance separations within predetermined acceptable limits. For example, in the case of a distance separation of at least a thousand feet or more, if the lower order (units) digit of comparison is ignored, the desired separation will be indicated plus or minus 10 feet or within at least 1 percent of the desired distance of separation.

Furthermore, in the exemplary embodiment, different indications are also provided whenever the actual distance of separation is greater than or less than the desired programmed distance of separation. When the desired distance of separation (within acceptable limits as previously discussed) exists, a steady tone is emitted from the apparatus. If the actual distance of separation is less than the desired distance, another but lower tone is emitted in short bursts. Also, if the actual distance of separation is greater than the desired distance, another but higher tone frequency is emitted in short bursts. Provisions are also made for causing the repetition rate of the bursts to occur at a rate proportional to the rate of vehicle separation or closure as the case may be. The net result of all these different indications for the corresponding different possible situations provide valuable guidance to the vehicle operators for effecting adjustments to the distance of separation and thus facilitate the maintenance of the desired distance of separation as should be appreciated.

In the exemplary embodiment, the distance pulses generated in the lead vehicle are transmitted via a radio frequency communication link to the tracking vehicle whereat the up-down counter and comparison means are located. Thus, the different indications of greater than, equal, and less than the desired distance of separation are presented to the operator of the tracking vehicle so that this vehicle may adjust its speed to maintain the desired separation distance and to mark the highway appropriately. However, those in the art will readily appreciate that the situation could just as well be reversed if desired to provide the transmission of distance pulses from the tracking vehicle to the lead vehicle. Furthermore, the distance pulses for each vehicle could be transmitted to the other vehicle with up-down counters and comparison circuits, etc., located at both the lead and tracking vehicles if desired. Finally, if it is only desired to monitor the distance of separation between the two vehicles, the distance pulses could be radio transmitted to some other remote point where the up-down counters, comparators, etc., are located to provide the desired monitoring of the distance of separation. Other variations and modifications of the exemplary embodiment will be apparent to those in the art.

A more complete and detailed understanding of this invention may be obtained from the following detailed discussion in conjunction with the accompanying drawings, of which.

Figure 1:
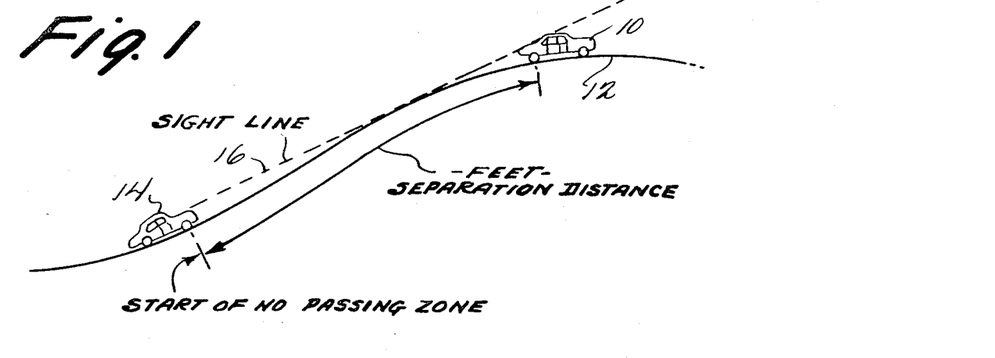
FIG. 1 is a diagram illustrating the process of marking no-passing zones on a highway with the help of this invention.

As shown in FIG. 1, a lead vehicle 10 is just passing over the crest of a hill 12 and is being followed by a tracking vehicle 14. The two vehicles 10 and 14 are properly maintained at a given separation distance as shown in FIG. 1. As soon as the tracking vehicle 14 loses sight of the lead vehicle 10 along the sight line 16, then the tracking vehicle 14 will begin to mark the highway surface to correspond to the beginning or start of a "no-passing" zone as previously discussed. This illustrates one situation in which the problem of maintaining a given separation between two vehicles presents itself. Of course, there are other such situations where this invention will also be of use. Furthermore, this invention will be useful where it is merely desired to monitor the distance of separation between two vehicles as will be appreciated by those in the art.

Figure 2:
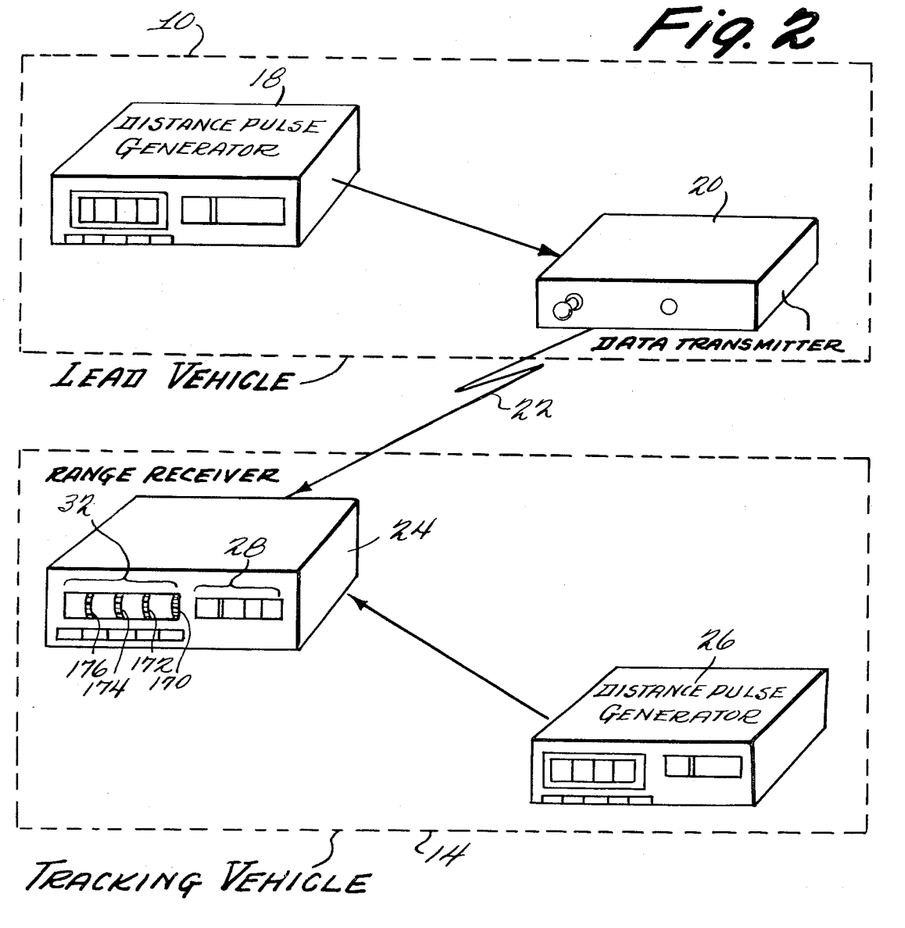
FIG. 2 is a block diagram of an exemplary embodiment of this invention.

A block diagram of an exemplary embodiment of this invention is shown in FIG. 2. Here, the lead vehicle 10 includes a distance pulse generator means 18 for generating a distance pulse representing a predetermined increment of distance travelled by the lead vehicle. A suitable distance pulse generator means 18 might comprise apparatus as disclosed in my co-pending U.S. Pat. application Ser. No. 194,401, filed Nov. 1, 1971. Alternatively, other apparatus and methods known to those in the art might be used for generating appropriate distance pulses representing increments of travelled distance as will be appreciated.

The distance pulses generated by device 18 are input to a radio frequency data transmitter 20 wherein the information content (representations of distance pulses) is transmitted over a radio frequency communications circuit 22. The radio frequency signals are received in the tracking vehicle 14 by a range receiver 24 which comprises a conventional radio receiver as well as up-down counting means, comparator means and indicating means as will be discussed in more detail below.

In addition, the tracking vehicle 14 also includes a distance pulse generator means 26 which is similar or identical to the distance pulse generating means 18 in the lead vehicle. The generator 26 generates distance pulses representing increments of distance travelled by the tracking vehicle 14 as should now be apparent and inputs such pulses to the range receiver 24.

The range receiver 24, subtracts the distance pulses generated by generator 26 from those received from the lead vehicle and displays the difference value on a numeric display 28 as the actual distance of separation between the two vehicles. Program thumbwheel switches 32 enable the operator of the tracking vehicle to dial in a predetermined desired distance of separation. The audio indication of the rate of vehicle closure and/or separation, etc., is provided from a speaker also mounted in the range receiver 24.

Any pulse generator which generates pulses representing predetermined increments of travelled distance may be used for the generators 18 and 26 as should be appreciated by those in the art. However, the preferred embodiment of this invention utilizes apparatus as disclosed in my earlier copending U.S. Pat. application Ser. No. 194,401. In this apparatus, means are disclosed for counting and displaying pulses representing any desired predetermined increment of travelled distance. Accordingly, the pulses input to the low order stage of the displayed count therein correspond to the lowest displayed increment of distance (such as one foot or any other desired predetermined unit of distance). If these pulses representing one foot of travelled distance are taken as an output, they may be utilized as the distance pulses output from generators 18 and 26 for use with this invention. On the other hand, if the programmable features and other improvements of my previous co-pending application are not required, more conventional pulse generators may be utilized for generators 18 and 26 as will be appreciated by those in the art.

Figure 3:
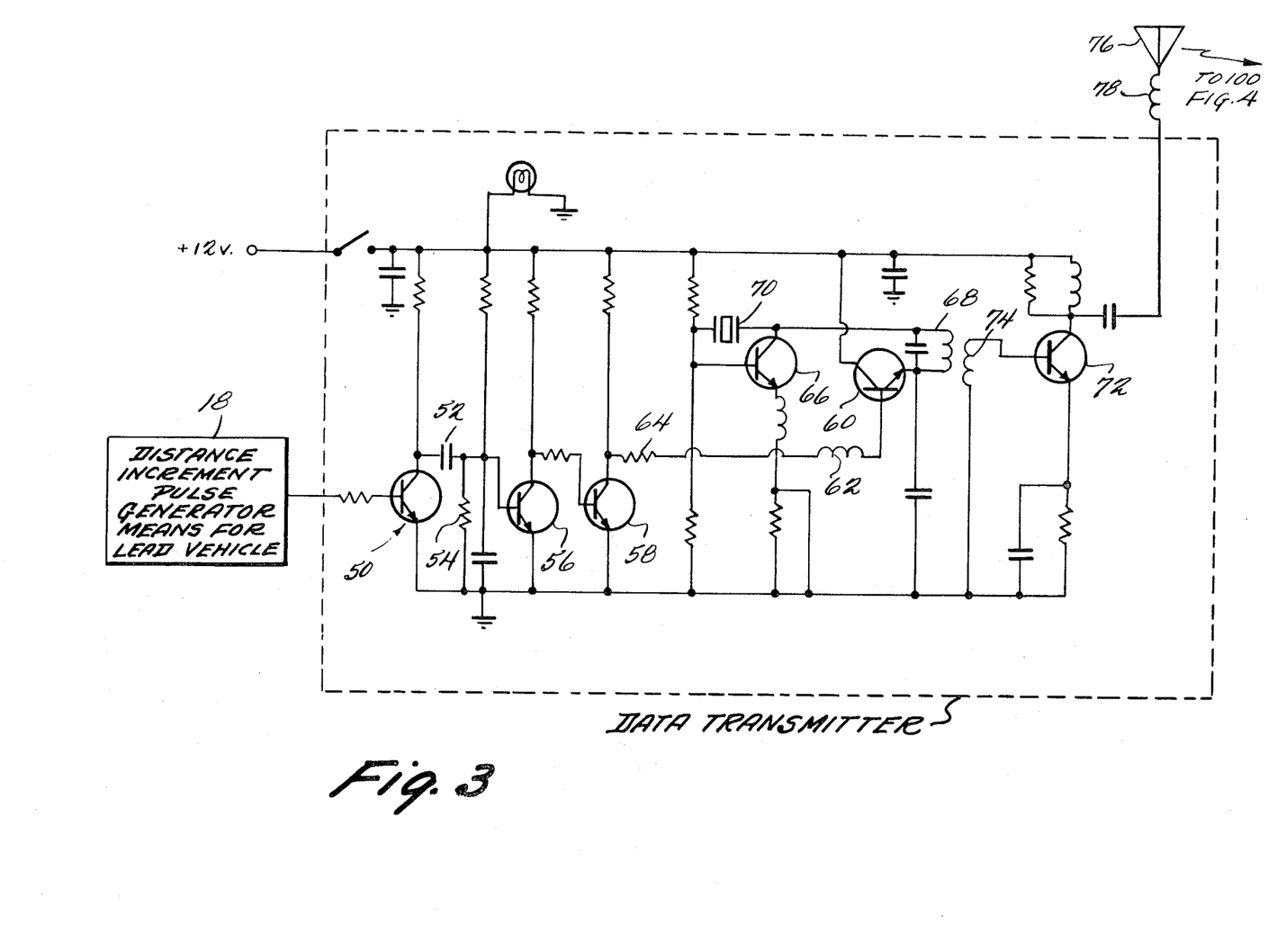
FIG. 3 is an electrical schematic of an exemplary data transmitter which may be used with this invention.

An exemplary embodiment of a radio frequency data transmitter 20 is shown in FIG. 3. As those in the art should appreciate, other equivalent radio transmitters could be substituted for this specific embodiment.

The data transmitter shown in FIG. 3 is self-explanatory to those in the art. The distance pulses representing increments of travelled distance for the lead vehicle are output from the generator means 18. In the exemplary embodiment, these pulses are approximately 1 millisecond in duration and are amplified by the common emitter transistor amplifier 50. The output of amplifier 50 is differentiated by the RC circuit comprising capacitor 52 and resistor 54 to produce an approximate 1 millisecond effective pulse width therefrom even if the input pulse should happen to be greater than 1 millisecond. The differentiated pulse is then further amplified by common emitter transistor amplifier 56 and 58 respectively as shown in FIG. 3. Transistors amplifier 56 is normally "on" and when presented with a differentiated input pulse is temporarily turned "off" for approximately 1 millisecond. Transistor amplifier 58 is normally "off" and is turned "on" for approximately 1 millisecond in response to the negative pulse coming from amplifier 56.

During the 1 millisecond when transistor amplifier 58 is turned "on," the base of transistor 60 is temporarily grounded through an RF choke 62 and resistor 64 thus turning transistor 60 "off" and removing the collector voltage supply from an RF frequency oscillator comprising transistor 66. The transistor 60 is normally "on" thus providing power through the inductor of the tuned circuit 68 to the transistor oscillator 66. Of course, the crystal 70 controls the frequency of oscillation as should be apparent to those in the art. The RF frequency signal normally generated by the oscillator 66 is coupled to the input of an output driver amplifier 72 through tuned circuit 68 and inductively coupled inductor 74 as shown in FIG. 3. The output of the driver 72 has been coupled to an antenna 76 through an antenna loading coil 78, all of which should be self-explanatory to those in the art.

In summary, the data transmitter 20 normally emits a continuous carrier wave at a frequency determined by crystal 70. This carrier is periodically turned "off" for approximately 1 millisecond in response to each distance pulse input from the generator 18. Preferably, the RF frequency used for this system would be in the 11 meter citizens band at some predetermined control frequency although it should be apparent that any suitable radio transmitting frequency might be utilized for this purpose.

Figure 4:
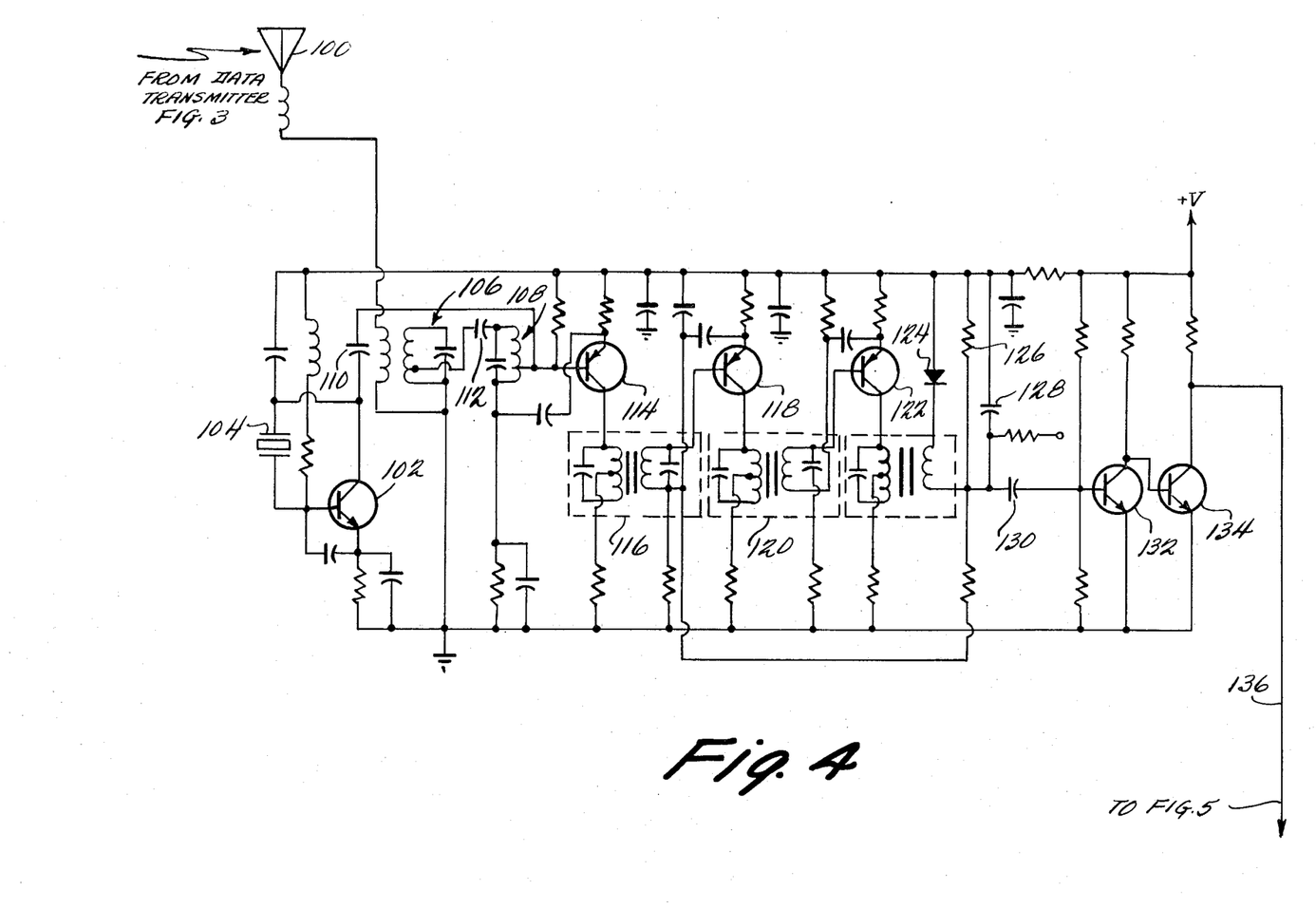
FIG. 4 is an electrical schematic of an exemplary data receiver that may be utilized with this invention.

The radio frequency signals transmitted from the data transmitter in FIG. 3 are received by antenna 100 connected to the input of the range receiver 24 as shown in FIG. 4. Of course, the range receiver 24 also includes most of the apparatus shown in FIGS. 5 and 6 as will be explained in more detail below.

The exemplary embodiment of the radio receiver shown in FIG. 4 may be altered or modified in an appropriate manner for particular applications as will be apparent by those in the art. Other equivalent radio receivers might also be substituted for the exemplary embodiment shown in FIG. 4.

The receiver shown in FIG. 4 includes a conventional local oscillator comprising transistor 102 whose frequency is controlled by crystal 104. The incoming radio frequency signal from antenna 100 is selected with a tuned circuit 106 which is, in turn, coupled to another tuned circuit 108. Tuned circuit 108 is tuned to the desired IF (intermediate frequency) frequency.

The local oscillator frequency is fed through coupling capacitor 110 to the tuned circuit 108 and mixes there with the selected RF frequency coupled through capacitor 112 to produce a corresponding IF frequency output which is coupled to the input of transistor amplifier 114. The output of the IF amplifier 114 is coupled through the IF transformer 116 to the input of a second IF amplifier 118. Likewise, the output of IF amplifier 118 is coupled through the IF transformer 120 to the input of a further IF amplifier 122 whose output is envelope detected by diode 124, and the RC circuit comprising resistor 126 and capacitor 128. The envelope signal is then coupled through capacitor 130 to two stages of amplification comprising transistors 132 and 134 as should now be apparent to those in the art.

In summarizing then, the radio receiver shown in FIG. 4 normally receives the continuous radio frequency signal from the data transmitter of FIG. 3, converts this to an IF frequency which is then amplified and its envelope detected to provide a first constant level of out-put on line 136.

Whenever another increment of distance has been travelled by the lead vehicle, a distance pulse will be provided by the generator means 18 shown in FIG. 3 to result in a 1 millisecond cessation of the RF frequency signal being transmitted by the data transmitter in FIG. 3. Consequently, there will also be a corresponding 1 millisecond cessation of the IF frequency in the receiver shown in FIG. 4 and a corresponding 1 millisecond negative pulse on line 136 as should now be apparent to those in the art.

Figure 5:
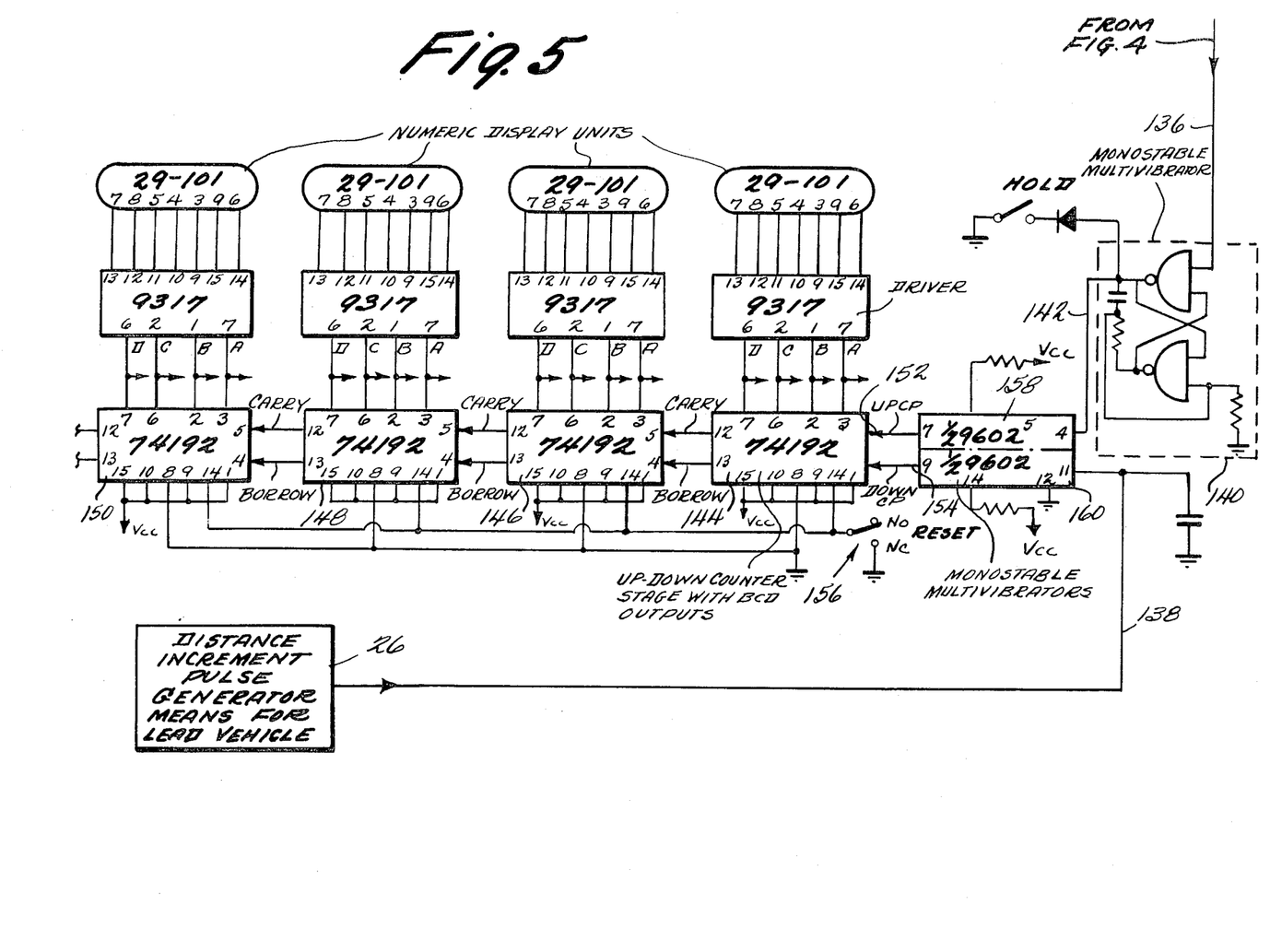
FIG. 5 is an electrical schematic of an exemplary up-down counter which may be utilized with this invention.

Another portion of the installation in the tracking vehicle is shown in FIG. 5. Here the distance pulse generator 26 is similar or identical with the generator means 18 already discussed in FIG. 3. Accordingly, there is one first train of distance pulses on line 136 corresponding to increments of distance travelled by the lead vehicle and another second train of distance pulses on line 138 corresponding to increments of distance travelled by the tracking vehicle.

If desired, a one-shot multivibrator 140 may be utilized to receive the first train of distance pulses on line 136 and provide a corresponding train of constant width output pulses on line 142 as is a familiar technique known to those in the art for generating standard width pulses from input pulses that may not be of precise duration. It will be recalled that the width of pulses on line 136 is only approximately 1 millisecond as determined by the RC differentiating circuit in the data transmitter shown in FIG. 3. Furthermore, other variations in the pulse width may be introduced by the ratio frequency transmitting and receiving processes as will be appreciated by those in the art. Accordingly, the one-shot multivibrator 140 may be inserted in the line to standardize the pulse widths of this train of distance pulses. If so, the pulse train on line 142 at the output of the one-shot multivibrator 140 is actually the same train of distance pulses as those appearing on line 136 except for the fact that the distance pulses on line 142 are now of more standard or uniform duration.

There are currently many integrated circuit packages commercially avilable for performing the commonly used digital functions. These integrated circuits are manufactured and marketed by many different companies but standard identifying numbers are utilized for such circuits regardless of their source of manufacture or supply. As shown in FIG. 5, the integrated circuit No. 74192 performs the function of counting either up or down in response to input pulses supplied at numbered terminals 5 and 4 respectively. Binary coded decimal (BCD) outputs (representative of 1 decimal digit) are supplied at output terminals numbered 3, 2, 6 and 7 and labeled A, B, C and D respectively in FIG. 5. As is usual with digital counting circuitry, when more than one stage is cascaded together, the capacity of the counter is increased by an order of magnitude for each further cascaded counter stage. As shown in FIG. 5, there are four stages of up-down counters with the first stage 144 representing the units digit; stage 146 representing the tens digit; stage 148 representing the hundreds digit and stage 150 representing the thousands digit in a decimal system. Obviously, further stages of up-down counters 74192 might be added if desired.

As shown in FIG. 5, the various stages of up-down counters 144, 146, 148 and 150 are interconnected with carry and borrow leads such that pulses input on lead 152 will cause the cascaded chain of up-down counters to count upwards (i.e., increasing the contents of the up-down counter) while pulses supplied on lead 154 will cause the counter stages to count downwardly (i.e., to decrement or decrease the contents of the up-down counter). The up-down counter contents may be reset to zero or any desired starting point by a reset switch 156 as should be appreciated by those in the art.

The train of distance pulses representing increments of travel distance for the lead vehicle are effectively coupled to the lead 152 or up-counting input of the up-down counter while the train of distance pulses representing increments of travelled distance for the tracking vehicle are effectively coupled to input 154 or down-counting input of the up-down counter. Accordingly, the contents of the up-down counter represents the difference between the number of travelled distance increments for the lead vehicle and the number of travelled distance increments for the tracking vehicle or, in other words, the distance of separation in terms of a desired basic distance increment between the lead and tracking vehicle.

While these trains of distance pulse on lines 138 and 142 might be directly coupled to inputs 154 and 152 respectively, very short time constant one-shot multivibrators are preferably inserted in series in both these lines to reduce the possibility of simultaneous application of distance pulses to both the up-counting and the down-counting terminals 152 and 154. As shown in FIG. 5, one-shot multivibrator 158 comprises one-half of an integrated circuit No. 9602 and is inserted in series between line 142 and input lead 152 to the up-counting input of the up-down counter. That is, the distance pulses appearing on line 142 and representing increments of travelled distance for the lead vehicle trigger the one-shot multivibrator 158 and cause a short duration output pulse for triggering the up-counting terminal 152 of the up-down counter.

Similarly, another similar one-shot multivibrator 160 comprising one-half of an integrated circuit No. 9602 is inserted in series between the line 138 carrying distance pulses representing increments of travelled distance for the tracking vehicle and the down-counting input terminal 154 of the up-down counter. That is, the distance pulses on line 138 trigger the one-shot multivibrator 160 to produce a short duration output pulse at its output for triggering the down-counting input of the up-down counter means.

Of course, the shorter the time constant for the one-shot multivibrators 158 and 160, the better since this will minimize the probability of simultaneous triggering of terminals 152 and 154 of the up-down counter means. On the other hand, the time constant of the one-shot multivibrators 158 and 160 must not be too short or the up-down counters will not be properly triggered. In the preferred embodiment, an appropriate compromise between these two considerations has been found to be a 50 nano second time constant for these two multivibrators. That is, each one of the distance pulses will result in a very narrow 50 nano second negative pulse at the output of the corresponding multivibrator for triggering the up-down counters in either the up or down direction as appropriate.

The binary coded decimal outputs of each of the four stages of up-down counters shown in FIG. 5 are connected to display drivers comprising integrated circuit Nos. 9317. The output of the display drivers are in turn connected to four stages of visible numeric display units such as those commonly identified as type No. 29-101 as shown in FIG. 5.

Those in the art will readily understand that other equivalent types of up-down counters, drivers and numeric display units might be substituted for those shown in the exemplary embodiment of FIG. 5. For instance, if integrated circuits are not used, conventional digital circuitry using discrete components might be substituted for these elements. Obviously, other types of integrated circuits could be utilized as well if desired.

The difference of separation between the lead and tracking vehicle is now represented by the contents of the up-down counter and may be monitored by the numeric displays previously discussed. Furthermore, the binary coded decimal outputs of the various stages of the up-down counter may be used to drive any kind of desired recording instrument and/or be routed for any desired utilization as will be apparent to those in the art.

Figure 6:
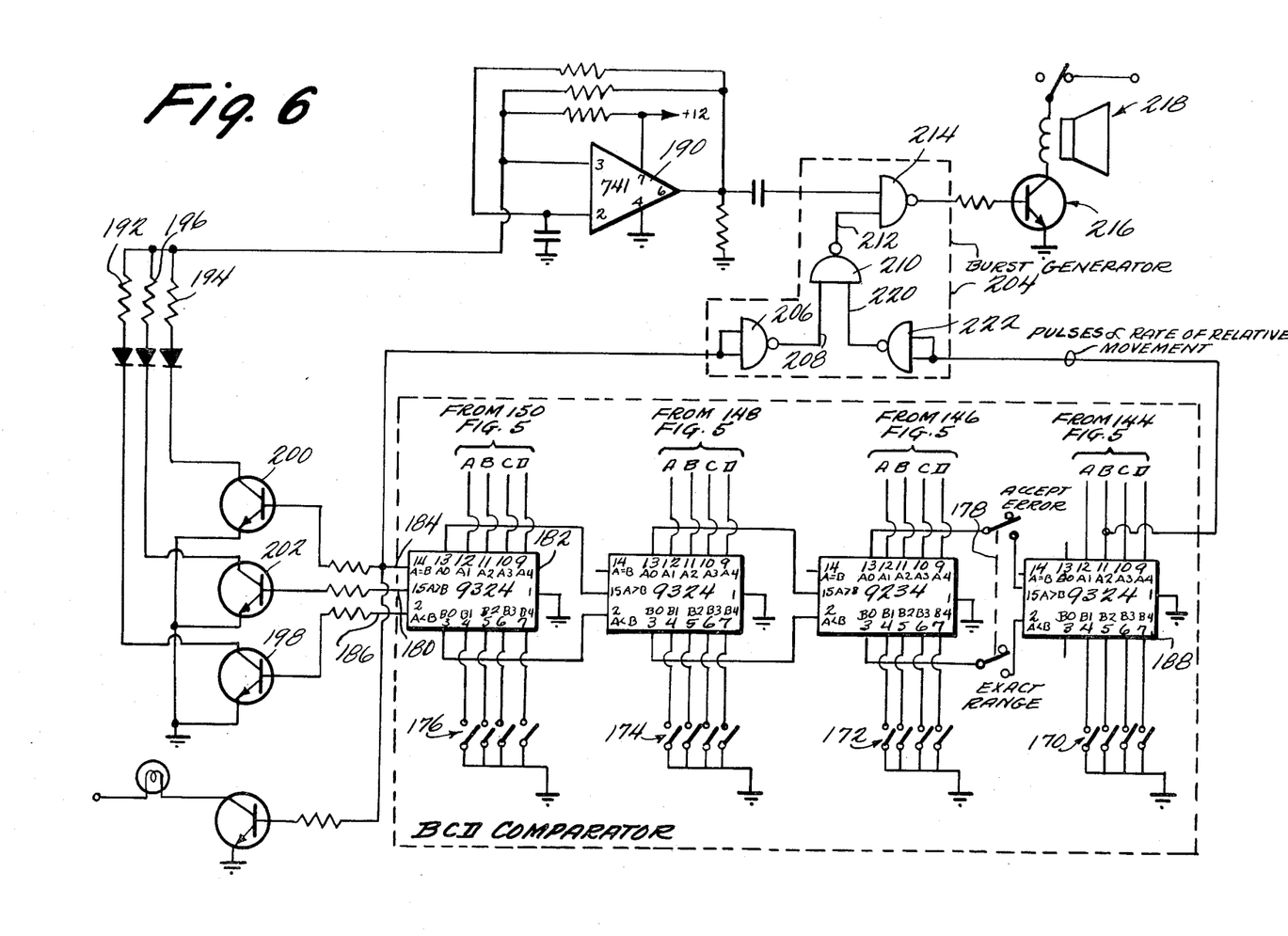
FIG. 6 is a schematic of an exemplary comparator and indicator circuit which may be used with this invention.

One such further utilization of the binary coded decimal outputs from the up-down counter stages in the exemplary embodiment is shown in FIG. 6. Here, the binary coded decimal outputs A, B, C and D from the up-down counter stages 144, 146, 148 and 150 are shown connected to the respective A-series inputs of integrated circuit binary coded decimal comparators comprising integrated circuit Nos. 9324 for each stage of comparison as shown in FIG. 6. The A-series inputs are connected to pins 9, 10, 11 and 12 and these BCD inputs are compared with another set of BCD inputs on the B-series inputs presented at terminals 7, 6, 5 and 4 respectively. In the exemplary embodiment, the B-series inputs are preselectable by binary coded decimal thumb-wheel switches 170, 172, 174 and 176.

The BCD comparators 9324 provide an output at pin 14 wherever the A-series inputs exactly equals the B-series inputs; an output on pin 15 whenever the BCD value of the A-series inputs exceeds that of the B-series inputs and an output at pin number 2 if the A-series inputs are less than the B-series inputs in value. As shown in FIG. 6, the outputs from pins 15 and 2 are connected to further A-series and B-series inputs respectively of the next higher stage comparators when the comparitors are cascaded to permit a comparison of multidigit BCD numbers as should be apparent to those in the art.

Assuming first for purposes of illustration, that the selector switch 178 is connected to the lower (or exact range) position (opposite from that actually shown in FIG. 6), the operation of the instrument would be as follows: first of all, a desired predetermined distance of separation would be dialed or programmed into the machine by appropriate actuation of switches 170, 172, 174 and 176. This would result in setting up a pattern of voltages on the B-series inputs of the various stages of BCD comparators representing the desired predetermined distance of separation. As the distance of separation decreases (when the tracking vehicle is moving up on the lead vehicle) the actual distance of separation as represented by the BCD inputs on the A-series terminals will be greater than the B-series inputs to result in a final output on lead 180 corresponding to pin 15 of the final stage 182 of BCD comparator integrated circuit No. 9324 as shown in FIG. 6. When the distance of separation actually equals the predetermined desired distance, the A-series inputs will exactly equal the B-series inputs on all stages of the BCD comparators thus providing an output on pin 14 of BCD comparator 182 or an output on line 184.

If the tracking vehicle continues to accelerate with respect to the lead vehicle, the actual distance of separation will then become less than the predetermined preset distance of separation to result in the A-series inputs being less than the B-series inputs to produce a final output on line 186 corresponding to pin number 2 of the final stage of BCD comparator 182.

Now if switch 178 is changed to the "accept error" position as shown in FIG. 6, the initial or low order stage of comparator 188 is effectively by-passed thus permitting an "A equals B" output on line 184 regardless of the comparison made in BCD comparator 188 corresponding to the lowest order stage of comparison (the units position). This means there can be a variance of ± 10 units from the predetermined distance of separation without changing the A equals B output on line 184. Accordingly, switch 178 permits the system to continue to show that the actual distance of separation is equal to the desired distance of separation within a predetermined range of error. In the case of distances equal to or greater than 1,000 units, this would correspond to an acceptable error of approximately ±1 percent.

An operational amplifier 190 (integrated circuit number 741) is connected with feedback to operate as an audio frequency oscillator. The amount of resistance connected between pin number 3 and ground will effectively determine the frequency of oscillation. Three differently valued resistors 192, 194 and 196 are connected to pin 3 and may be selectively gated by transistors 198, 200 and 202 respectively to a ground potential. Accordingly, the frequency at which oscillator 190 oscillates is effectively determined by which one of transistors 198, 200 or 202 is turned "on" as should now be apparent.

As shown in FIG. 6, transistor 198 is turned on whenever pin number 2 of BCD comparator 182 provides an output indicating that the A-series inputs is less than the B-series inputs or, in other words, that the actual distance of separation is less than the programmed desired distance of separation.

Transistor 200 is turned "on" whenever an output is provided at pin number 14 of BCD comparator 182 thus indicating that the A-series inputs equals the B-series inputs (plus or minus the acceptable error if the range switch 178 is positioned as shown) or, in other words, that the actual distance of separation within the acceptable limits of error.

Transistor 202 is turned "on" whenever an output is present at pin number 15 of BCD comparator 182 corresponding to a condition wherein the A-series inputs has a BCD value greater than the B-series inputs or, in other words, whenever the actual distance of separation is greater than the programmed desired distance of separation.

In the exemplary embodiment, resistors 192, 194 and 196 have values chosen to cause the oscillator 190 to oscillate at 300, 500 and 800 Hz respectively. That is, the frequency of the oscillator 190 is equal to 500 Hz when the desired distance of separation exists, it is equal to 300 Hz (less than 500) whenever the distance of separation is less that that which is desired and is equal to 800 Hz (greater than 500) whenever the actual distance of separation is greater than the desired value.

Accordingly, the output of the oscillator 190 represents the results of the comparison process by differences in frequency. Its output could be directly coupled to an audio transducer to provide an audible signal indicative of the comparison process. By discriminating between the different produced tones, an operator of the tracking vehicle could use this audible indication to facilitate maintenance of the desired separation distance. Of course, the transistors 198, 200 and 202 could be used to turn lamp indicators on and off, etc., or other kinds of humanly sensible indicators to provide the same kind of information useful in facilitating the desired distance of separation between the two vehicles.

However, in the exemplary embodiment shown in FIG. 6, additional means are provided for further distinguishing different types of information available from the comparison process. In essence, this comprises the gating means or burst generator 204. Both inputs of a NAND gate 206 are connected to lead 184 such that whenever a "high" output is provided here to indicate an acceptable distance of separation, gate 206 provides a "low" output on line 208 as one of the inputs to gate 210. Accordingly, the output of gate 210 on line 212 will always be maintained "high" thus constantly enabling the gate 214 to be switched "on" and "off" at the 500 Hz rate being provided by the output of oscillator 190. This will, of course, result in a 500 Hz continuous tone which is amplified by amplifier 216 and passed on to loudspeaker 218.

Accordingly, whenever the actual distance of separation equals the desired distance of separation (within acceptable limits) a continuous 500 Hz tone will be produced as the output of speaker 218.

On the other hand, when there is no output on line 184 (thus meaning there must be an output on either 180 or 186 corresponding to an actual distance of separation greater than or less than the desired distance respectively) then both inputs to NAND gate 206 are "low." This means that the output on line 208 must be "high" thus causing line 212 to fluctuate between "high" and "low" in dependence upon the other input to gate 210 on line 220. That is, if line 220 is "low," then the output on line 212 will be "high." If line 220 goes "high" then the output on line 212 will go "low." Accordingly, the gate 214 is alternately enabled and then blocked depending upon whether line 212 is "high" or "low" respectively which, in turn, is dependent upon the condition of line 220. Whenever gate 214 has a "high" input on line "212," it will effectively "pass" the output of oscillator 190 (300 or 800 Hz) to amplifier 216 and speaker 218 as previously discussed. On the other hand, whenever the input on line 212 of NAND gate 214 goes "low," the output of the oscillator 190 will be effectively blocked from the amplifier 216 and speaker 218.

The condition of the input on line 220 is determined by NAND gate 222 which has both inputs connected to terminal B of the up-down counter stage 144. Terminal B of the up-down counter stage 144 which terminal will fluctuate between "low" and "high" voltage values at a rate which is approximately proportional to the rate or speed at which the lead and tracking vehicles close upon one another or separate from one another as the case may be.

In other words, this is a convenient technique for deriving a signal which is approximately proportional infrequency to the rate of relative movement between the lead and tracking vehicles. Since both inputs of the NAND gate 222 are connected to this terminal B, the output of NAND gate 222 on line 220 will also fluctuate between "high" and "low" values at a rate approximately proportional to the rate of vehicle separation or closure as the case may be. Accordingly, gate 214 will pass short bursts of the 300 or 800 Hz signals with the repetition rate of the tone bursts being approximately proportional to the rate of vehicle separation or closure. As should be apparent, this is another indication of information relating to the distance of separation between the two vehicles which may be utilized by the operator of one of the vehicles to facilitate maintenance of the desired separation distance.

Of course, if audio signals are not used but instead some other equivalent technique such as flashing lights, etc., are utilized for indicating the 3 possible outputs of the comparators, similar measures could be taken in such an alternative embodiment to cause the light flashing to occur at a rate proportional to the vehicle separation and/or closure, etc., as should be apparent to those in the art.

While only one specific exemplary embodiment of this invention has been described in detail, those in the art will readily recognize that many modifications and/or substitutions may be made in the exemplary embodiment without in anyway departifrom the spirit of the invention or from the previously discussed objectives and advantages to be derived therefrom. Accordingly, all such modifications and/or substitutions are intended to be included within the scope of this invention.

What is claimed is:

1. A system for monitoring the distance of separation between a lead vehicle and a tracking vehicle, said system comprising:

first data generating means disposed in said lead vehicle for providing a first pulse train representing predetermined increments of distance travelled from a starting location by said lead vehicle, second data generating means disposed in said tracking vehicle for providing a second pulse train representing similar predetermined increments of distance travelled from said starting location by said tracking vehicle, radio transmitting means connected to at least one of said first and second data generating means for transmitting its respectively corresponding pulse train to a common site, up-down counter means disposed at said common site having a first input to which applied pulses cause the counter means contents to successively increment in a first sense or direction and a second input to which applied pulses cause the counter means contents to successively increment in a second sense or direction opposite to said first sense, and means for applying said first pulse train to said first input and said second pulse train to said second input whereby the contents of said counter means represents the difference between said first and second pulse trains and hence the distance of separation between said lead and tracking vehicles.

2. A system as in claim 1 wherein:

said first data generating means comprises pulse generator means installed in said lead vehicle for generating distance pulses representing said predetermined increments of distance travelled by said lead vehicle, and said radio transmitting means comprises data transmitter means installed in said lead vehicle for transmitting representations of said distance pulses to a remote location.

3. A system as in claim 2 further comprising:

data receiving means installed in said tracking vehicle for receiving the transmitted representations of said distance pulses and producing said first pulse train therefrom.

4. A system as in claim 3 wherein said data receiving means further comprises:

a monostable multivibrator means connected for triggering by said transmitted representations to produce substantially uniform pulse widths in said first pulse train.

5. A system as in claim 1 further comprising:
first monostable multivibrator means having an input connected for triggering by said first pulse train and an output connected to said first input for providing thereto a corresponding pulse train of pulses having predetermined durations,
second monostable multivibrator means having an input connected for triggering by said second pulse train and an output connected to said second input for providing thereto a coresponding pulse train of pulses having predetermined durations,
said predetermined durations of pulses output from said first and second monostable multivibrator means being substantially smaller than normal pulse durations in said first and second pulse trains respectively thereby reducing the probability of simultaneously pulsing said first and second inputs.

6. A system as in claim 1 wherein said second data generating means comprises:
pulse generator means installed in said tracking vehicle for generating distance pulses representing said predetermined increments of distance travelled by said tracking vehicle.

7. A system as in claim 1 further comprising:
program means disposed at said common site for generating program signals representing an adjustable predetermined value of distance separation, and
comparator means disposed at said common site and connected to said program switch means and to said up-down counter means for comparing the contents of said up-down counter means with said predetermined value and for providing an output representative of this comparison.

8. A system as in claim 7 wherein said program means comprises:
a plurality of manually actuatable switches connected to a first set of inputs to said comparator means.

9. A system as in claim 7 wherein:
said comparator means has a first set of inputs connected to said program means and a second set of inputs connected to interstage outputs of said up-down counter means.

10. A system as in claim 7 wherein said comparator means includes:
means for effectively bypassing a comparison of at least one low order digit whereby the comparator means output remains unaffected by changes in said at least one low order digit of comparison.

11. A system as in claim 7 further comprising:
visual diaplay means connected to said updown counter means for providing a visual display of the contents of the up-down counter means.

12. A system for monitoring the distance of separation between a lead vehicle and a tracking vehicle, said system comprising:
first data generating means for providing a first pulse train representing predetermined increments of distance travelled by said lead vehicle,
second data generating means for providing a second pulse train representing similar predetermined increments of distance travelled by said tracking vehicle,
up-down counter means having a first input to which applied pulses cause the counter means contents to successively increment in a first sense or direction and a second input to which applied pulses cause the counter means contents to successively increment in a second sense or direction opposite to said first sense,
means for applying said first pulse train to said first input and said second pulse train to said second input whereby the contents of said counter means represents the difference between said first and second pulse trains and hence the distance of separation between said lead and tracking vehicles,
program means for generating program signals representing a predetermined value of distance separation, and
comparator means connected to said program switch means and to said up-down counter means for comparing the contents of said up-down counter means with said predetermined value and for providing an output representative of this comparison,
said comparator means including means for providing:
a first output when the compared contents of said counter means is less than said predetermined value,
a second output when the compared contents of said counter means is equal to said predetermined value,
a third output when the compared contents of said counter means is greater than said predetermined value, and
indicator means connected to receive said first, second and third outputs and to produce indications respectively indicative thereof.

13. A system as in claim 12 wherein said indicator means comprises:
an audio signal generator means for producing at least three different audio outputs respectively representative of said first, second and third outputs.

14. A system as in claim 13 wherein said audio signal generator means comprises:
oscillator means fr producing first, second, and third frequency signals in response to said first, second and third outputs respectively.

15. A system as in claim 14 wherein said first frequency is less than said second frequency and said second frequency is less than said third frequency.

16. A system as in claim 14 wherein said audio signal generator means further comprises:
means for producing bursts of said first and third frequencies and a steady tone of said second frequency.

17. A system as in claim 16 wherein said last-mentioned means includes control means for causing the repetition rate of said bursts to be approximately proportional to the rate of relative movement between said lead and tracking vehicles.

18. A system as in claim 17 wherein said control means is connected to an output of a low order stage of said up-down counter means and controlled thereby.

19. A method for monitoring the distance of separation between a lead vehicle and a subsequent tracking vehicle, said method comprising:
generating in said lead vehicle first signals representing predetermined increments of distance travelled by said lead vehicle from a given starting location,
generating in said tracking vehicle second signals representing predetermined increments of distance travelled by said tracking vehicle from said given starting location, transmitting at least one of said first and second signals via radio frequency energy to a common site, processing at said common site, and said first and second signals to obtain a different value between distances travelled by said lead and tracking vehicles whereby said difference value represents the distance of separation between said lead vehicle and said tracking vehicle.

20. A method as in claim 19 further comprising the steps of:

generating at said common site signals representing a predetermined distance separation value, automatically comparing said predetermined distance separation value with said difference value, and providing a humanly sensible output representing the result of such a comparison.

21. A method as in claim 20 wherein the step of providing a humanly sensible output comprises:

generating audio tone bursts when said difference value differs from said predetermined distance separation value by more than a predetermined margin of allowable error, the repetition rate of said tone bursts being proportional to the rate of relative movement between said lead and tracking vehicles, and generating a steady audio tone when said difference value and said predetermined distance separation value are within said predetermined margin of allowable error.

22. A method as in claim 19 wherein said step of transmitting comprises:

transmitting said first signals from said lead vehicle, and receiving said first signals at said tracking vehicle.

* * * * *

UNITED STATES PATENT OFFICE
CERTIFICATE OF CORRECTION

Patent No. 3,796,864  Dated March 12, 1974

Inventor(s) Harry R. Sampey

It is certified that error appears in the above-identified patent and that said Letters Patent are hereby corrected as shown below:

IN THE SPECIFICATION:

Column 9, lines 41-42, change "decreases (when the tracking vehicle is moving up on the lead vehicle)" to --increases (when the lead vehicle is moving away from the tracking vehicle)--.

Signed and sealed this 4th day of February 1975.

(SEAL)
Attest:

McCOY M. GIBSON JR.
Attesting Officer

C. MARSHALL DANN
Commissioner of Patents